US012446627B2

(12) United States Patent
Tan et al.

(10) Patent No.: US 12,446,627 B2
(45) Date of Patent: Oct. 21, 2025

(54) ATOMIZER AND ELECTRONIC ATOMIZATION DEVICE

(71) Applicant: SHENZHEN SMOORE TECHNOLOGY LIMITED, Guangdong (CN)

(72) Inventors: Junwei Tan, Shenzhen (CN); Zhihua Wen, Shenzhen (CN); Yongguang Chen, Shenzhen (CN); Danchong He, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 800 days.

(21) Appl. No.: 17/840,048

(22) Filed: Jun. 14, 2022

(65) Prior Publication Data

US 2022/0304391 A1 Sep. 29, 2022

Related U.S. Application Data

(63) Continuation of application No. PCT/CN2020/127083, filed on Nov. 6, 2020.

(30) Foreign Application Priority Data

Dec. 17, 2019 (CN) ......................... 201922279855.3

(51) Int. Cl.
*A24F 40/485* (2020.01)
*A24F 40/10* (2020.01)
(Continued)

(52) U.S. Cl.
CPC ............ *A24F 40/485* (2020.01); *A24F 40/10* (2020.01); *A24F 40/42* (2020.01); *F16K 15/147* (2013.01)

(58) Field of Classification Search
CPC .......... A24F 40/48; A24F 40/44; A24F 40/40; A24F 40/10
See application file for complete search history.

(56) References Cited

U.S. PATENT DOCUMENTS 5,483,854 A * 1/1996 King ....................... B67B 7/066 D8/42
2015/0157054 A1 6/2015 Liu
(Continued)

FOREIGN PATENT DOCUMENTS

CN 105768233 A 7/2016
CN 206213284 U 6/2017
(Continued)

OTHER PUBLICATIONS

European Patent Office, Search Report in European Patent Application No. 20903897.5 (Jan. 27, 2023).
(Continued)

*Primary Examiner* — Alex B Efta
(74) *Attorney, Agent, or Firm* — Leydig, Voit & Mayer, Ltd.

(57) ABSTRACT

A vaporizer includes: a housing having an air inlet and an air outlet; an airflow channel formed in the housing and running through the air inlet and the air outlet; a liquid storage tank disposed in the housing; a vaporization component disposed in the airflow channel and in fluid communication with the liquid storage tank; an air inlet valve disposed in the airflow channel between the air inlet and the vaporization component, an air outlet portion of the air inlet valve being disposed close to the vaporization component, an air inlet portion of the air inlet valve being disposed away from the vaporization component; a leaked liquid storage region for storing leaked liquid, the leaked liquid storage region being formed between the air inlet valve and the vaporization
(Continued)

component; and at least one gulp valve disposed in the housing.

20 Claims, 8 Drawing Sheets

(51) Int. Cl.

| | |
|---|---|
| ***A24F 40/42*** | (2020.01) |
| ***F16K 15/14*** | (2006.01) |

(56) References Cited

U.S. PATENT DOCUMENTS

| | | | | |
|---|---|---|---|---|
| 2016/0270446 | A1 | 9/2016 | Shenkal et al. | |
| 2017/0119055 | A1 | 5/2017 | Liu | |
| 2019/0230986 | A1 | 8/2019 | Zinovik et al. | |
| 2019/0373953 | A1 * | 12/2019 | Atkins | A24F 40/44 |
| 2021/0274846 | A1 * | 9/2021 | Potter | A24F 40/485 |

FOREIGN PATENT DOCUMENTS

| | | | |
|---|---|---|---|
| CN | 207011690 | U | 2/2018 |
| CN | 207855035 | U | 9/2018 |
| CN | 107072307 | B | 1/2020 |
| CN | 211746967 | U | 10/2020 |
| EP | 3393278 | A1 | 10/2018 |
| EP | 3469937 | A2 | 4/2019 |

OTHER PUBLICATIONS

Patent Cooperation Treaty, International Search Report, International Application No. PCT/CN2020/127083 (Jan. 27, 2021).

Patent Cooperation Treaty, Written Opinion of the International Searching Authority, International Application No. PCT/CN2020/127083 (Jan. 27, 2021).

* cited by examiner

ATOMIZER AND ELECTRONIC ATOMIZATION DEVICE

CROSS-REFERENCE TO PRIOR APPLICATION

This application is a continuation of International Patent Application No. PCT/CN2020/127083, filed on Nov. 6, 2020, which claims priority to Chinese Patent Application No. CN 201922279855.3, filed on Dec. 17, 2019. The entire disclosure of both applications is hereby incorporated by reference herein.

FIELD

This application relates to the technical field of electronic vaporization devices, and specifically, to a vaporizer and an electronic vaporization device.

BACKGROUND

An existing electronic vaporization device includes a vaporizer and a body. The body includes a battery, a circuit board, and an airflow sensor, and the vaporizer includes a liquid storage tank storing vaporization raw materials, a vaporization element, and an airflow channel. A vent hole is generally provided at a bottom of the vaporizer, so that one end of the airflow channel is led to the airflow sensor of the body, and the airflow sensor can sense airflow changes during inhaling to start heating. However, during transportation or use, liquid leakage may occur in the liquid storage tank of the vaporizer due to air pressure changes or other reasons, and the liquid may enter the body through the vent hole at the bottom of the vaporizer, which easily pollutes and damages the airflow sensor or the battery.

SUMMARY

In an embodiment, the present invention provides a vaporizer, comprising: a housing comprising an air inlet and an air outlet; an airflow channel formed in the housing and running through the air inlet and the air outlet; a liquid storage tank disposed in the housing; a vaporization component disposed in the airflow channel and in fluid communication with the liquid storage tank; an air inlet valve disposed in the airflow channel between the air inlet and the vaporization component, an air outlet portion of the air inlet valve being disposed close to the vaporization component, an air inlet portion of the air inlet valve being disposed away from the vaporization component; a leaked liquid storage region configured to store leaked liquid, the leaked liquid storage region being formed between the air inlet valve and the vaporization component; at least one gulp valve disposed in the housing, an air outlet portion of the at least one gulp valve being located in the liquid storage tank, and an air inlet portion of the at least one gulp valve being in communication with external air; and a suction nozzle valve disposed in the airflow channel and located between the air outlet and the vaporization component, an air outlet portion of the suction nozzle valve facing the air outlet, and an air inlet of the suction nozzle valve facing the vaporization component.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
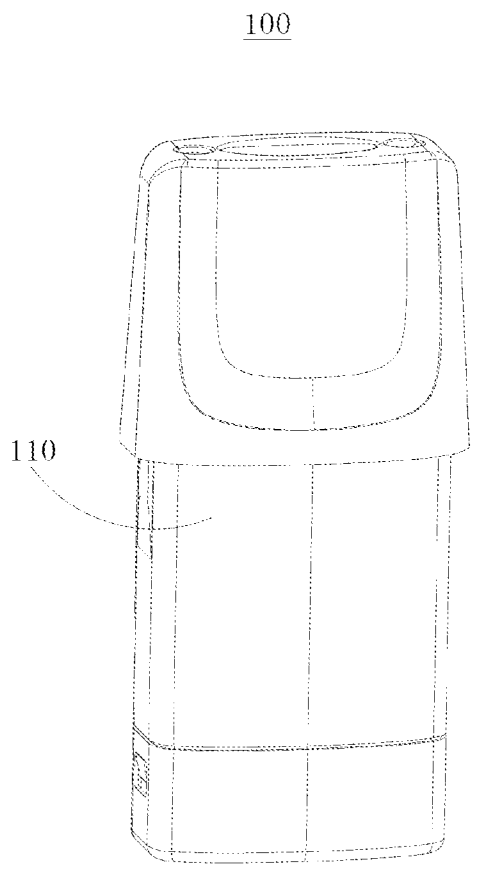
FIG. 1 is a three-dimensional schematic structural diagram of a vaporizer according to an embodiment of this application.

In an embodiment, the present invention provides a vaporizer and an electronic vaporization device, to resolve the technical problem that the vaporizer is damaged due to liquid leakage of a liquid storage tank of the vaporizer.

In an embodiment, the present invention provides a vaporizer, including: a housing, provided with an air inlet and an air outlet; an airflow channel, formed in the housing and running through the air inlet and the air outlet; a liquid storage tank, disposed in the housing; a vaporization component, disposed in the airflow channel and in fluid communication with the liquid storage tank; an air inlet valve, disposed in the airflow channel between the air inlet and the vaporization component, where an air outlet portion of the air inlet valve is close to the vaporization component, an air inlet portion of the air inlet valve is away from the vaporization component, and a leaked liquid storage region for storing leaked liquid is formed between the air inlet valve and the vaporization component; a gulp valve, disposed in the housing, where an air outlet portion of the gulp valve is located in the liquid storage tank, and an air inlet portion of the gulp valve is in communication with external air; and a suction nozzle valve, disposed in the airflow channel and located between the air outlet and the vaporization component, where an air outlet portion of the suction nozzle valve faces the air outlet, and an air inlet of the suction nozzle valve faces the vaporization component.

According to an implementation of this application, the air inlet valve is opened when pressure of the air inlet portion side of the air inlet valve is greater than pressure in the airflow channel on the air outlet portion side of the air inlet valve by at least 100 pa.

According to an implementation of this application, the gulp valve is located on a first end provided with the air outlet of the housing; and/or the gulp valve is located on a second end provided with the air inlet of the housing; and/or the gulp valve is located on a side wall between the first end and the second end of the housing.

According to an implementation of this application, there are three gulp valves, and the three gulp valves are respectively located on the first end provided with the air outlet of the housing, the second end provided with the air inlet of the housing, and the side wall between the first end and the second end of the housing.

According to an implementation of this application, the gulp valve is opened when pressure of the air inlet portion side of the gulp valve is greater than pressure in liquid storage tank by at least 100 pa.

According to an implementation of this application, the suction nozzle valve is opened when pressure of the air inlet portion side of the suction nozzle valve is greater than pressure outside the air outlet portion side of the suction nozzle valve by at least 100 pa.

According to an implementation of this application, the air inlet valve, the gulp valve, and the suction nozzle valve are all one-way valves, and each one-way valve includes: a base, provided with a through opening; and a deformable wall, disposed on the through opening and provided with a notch, where one side of the deformable wall connected to the through opening forms the air inlet portion, and the notch forms the air outlet portion.

According to an implementation of this application, the deformable wall includes two first deformable walls, and the two first deformable walls gradually draw close outward through the through opening to form a strip-shaped end and form the elongated notch at the strip-shaped end.

According to an implementation of this application, the deformable wall is in a shape of a cylinder and closed to form a hemispherical end after extending outward through the through opening, and forms the cross-shaped notch at the hemispherical end.

According to an implementation of this application, the hemispherical end is a deformable material.

According to an implementation of this application, the deformable wall is in a shape of a cylinder and closed to form a planar end after extending outward through the through opening, and forms two arc-shaped notches at the planar end, where the notch is in a shape of a minor arc.

According to an implementation of this application, the planar end is a deformable material.

According to an implementation of this application, the deformable wall is in a shape of a cylinder and closed to form a planar end after extending outward through the through opening, and forms an arc-shaped notch at the planar end, where the notch is in a shape of a major arc, and a support member supporting the planar end is disposed in the deformable wall.

According to an implementation of this application, the planar end is a deformable material.

According to an implementation of this application, the deformable wall is in a shape of a cylinder and closed to form a planar end after extending outward through the through opening, and forms an arc-shaped notch at the side wall.

According to an implementation of this application, the planar end is a deformable material.

According to an implementation of this application, the housing includes a mounting base, and the mounting base is configured to support the vaporization component and define the air inlet.

According to an implementation of this application, the vaporization component includes a vaporization core supported by the mounting base and fixed in the housing, one part of the vaporization core is located in the airflow channel, and the other part of the vaporization core is located in the liquid storage tank.

In order to resolve the technical problem, another technical solution adopted by this application is to provide an electronic vaporization device, including the vaporizer according to any one of the foregoing.

According to an implementation of this application, the electronic vaporization device includes a power supply component configured to supply power to the vaporizer.

Beneficial effects of this application are as follows: with the air inlet valve, even if fluid in the liquid storage tank leaks through the vaporization component, the liquid will accumulate in the leaked liquid storage region rather than being leaked through the air inlet valve, thereby preventing the leaked liquid from polluting and damaging other elements after leaked from the air inlet. In addition, after inhalation is completed, pressure in the airflow channel is increased, and vapor reflux may occur. In a case without the air inlet valve, the vapor may flow through the air inlet, encounter an outer wall of the vaporizer, and be condensed into liquid. However, the air inlet valve can prevent occurrence of vapor reflux.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Figure 2:
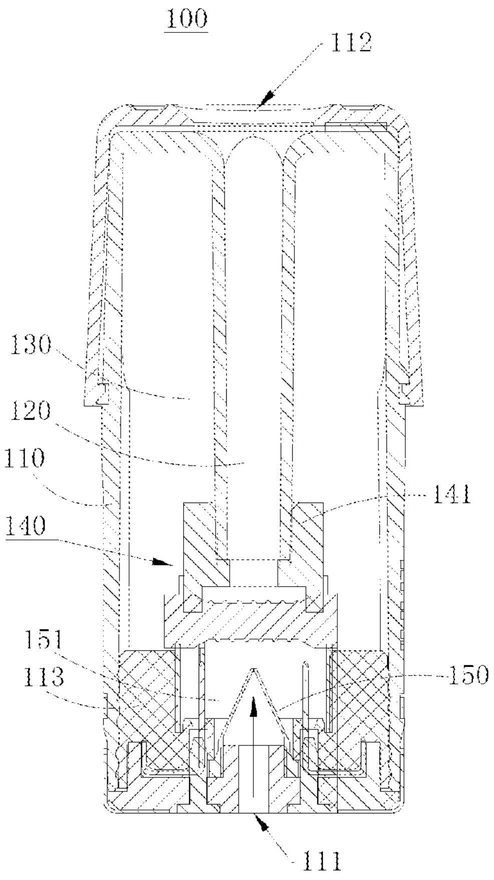
FIG. 2 is a schematic structural cross-sectional view of a vaporizer according to an embodiment of this application.
Figure 3:
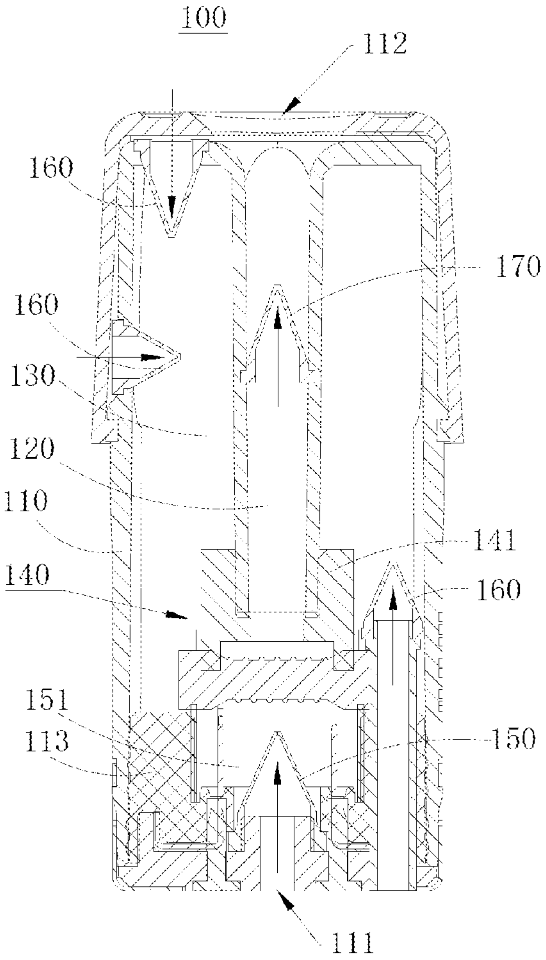
FIG. 3 is another schematic structural cross-sectional view of a vaporizer according to an embodiment of this application.
Figure 4:
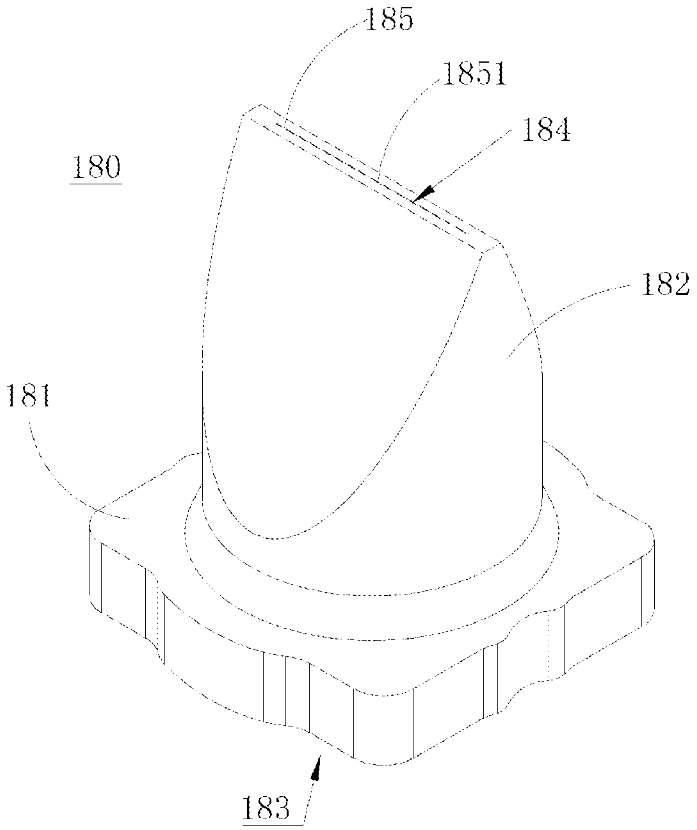
FIG. 4 is a three-dimensional schematic structural diagram of a one-way valve of a vaporizer according to an embodiment of this application.

Referring to FIG. 1 to FIG. 4, FIG. 1 is a three-dimensional schematic structural diagram of a vaporizer according to an embodiment of this application;

FIG. 2 is a schematic structural cross-sectional view of a vaporizer according to an embodiment of this application;

FIG. 3 is another schematic structural cross-sectional view of a vaporizer according to an embodiment of this application; and FIG. 4 is a three-dimensional schematic structural diagram of a one-way valve of a vaporizer according to an embodiment of this application.

As shown in FIG. 1 and FIG. 2, an embodiment of this application provides a vaporizer 100, which includes a housing 110, an airflow channel 120, a liquid storage tank 130, a vaporization component 140, and an air inlet valve 150. The housing 110 is provided with an air inlet 111 and an air outlet 112, and the airflow channel 120 is formed in the housing 110 and runs through the air inlet 111 and the air outlet 112. The liquid storage tank 130 is disposed in the housing 110 and stores raw material fluid for vaporization of the vaporization component 140, such as e-liquid. The vaporization component 140 is disposed in the airflow channel 120 and in fluid communication with the liquid storage tank 130, so that fluid in the liquid storage tank 130 can be supplied to the vaporization component 140 for the vaporization component 140 to vaporize. In an inhale process, external air enters from the air inlet 111, carries vapor formed through vaporization of the vaporization component

140 in the airflow channel 120, and flows out of the airflow channel through the air outlet 112.

The air inlet valve 150 is disposed in the airflow channel 120 between the air inlet 111 and the vaporization component 140, an air outlet portion of the air inlet valve 150 is close to the vaporization component 140, an air inlet portion of the air inlet valve 150 is away from the vaporization component 140, and a leaked liquid storage region 151 for storing leaked liquid is formed between the air inlet valve 150 and the vaporization component 140. When the vaporizer is not used, since pressure in the airflow channel 120 is greater than or equal to external pressure, the air inlet valve 150 may keep closed under action of a pressure difference or elasticity of the air inlet valve. Therefore, even if fluid in the liquid storage tank 130 leaks through the vaporization component 140, the liquid will accumulate in the leaked liquid storage region 151 rather than being leaked through the air inlet valve 150, thereby preventing the leaked liquid from polluting and damaging other elements after leaked from the air inlet 111. In addition, after inhalation is completed, the pressure in the airflow channel 120 is increased, and vapor reflux may occur. In a case without the air inlet valve 150, the vapor may flow through the air inlet 111, encounter an outer wall of the vaporizer 100, and be condensed into liquid. However, the air inlet valve 150 can prevent occurrence of vapor reflux.

In an embodiment, as shown in FIG. 2, the housing 110 includes a mounting base 113, where the mounting base 113 is configured to support the vaporization component 140 and define the air inlet 111, and the air inlet 111 and the air outlet 112 are respectively located on two ends of the housing 110. The vaporization component 140 includes a vaporization core 141 supported by the mounting base 113 and fixed in the housing 110, one part of the vaporization core is located in the airflow channel 120, and the other part is located in the liquid storage tank 130. The vaporization core 141 may be a porous ceramic body, a liquid guiding cotton layer is covered on a periphery of the vaporization core, and the liquid guiding cotton absorbs fluid from the liquid storage tank 130 for vaporization use.

In an embodiment, as shown in FIG. 2, when the vaporizer 100 is used, a user inhales at the air outlet 112, the pressure in the airflow channel 120 is decreased, the air inlet valve 150 is opened when the pressure of the air inlet portion of the air inlet valve 150 is greater than the pressure in the airflow channel 120 on the air outlet portion side by at least 100 pa, and the external air enters the airflow channel 120 through the air inlet valve 150. It should be noted that, the pressure difference between two sides and required for opening the air inlet valve 150 may be 200 pa, 500 pa, 1000 pa, 1500 pa, 2000 pa, or higher, and the pressure difference required for opening the air inlet valve 150 depends on a structure and a material of the air inlet valve 150. When the pressure of the air inlet portion of the air inlet valve 150 required for opening the air inlet valve 150 is greater than the pressure in the airflow channel 120 on the air outlet portion side by 100 pa to 2000 pa, the air inlet valve 150 can not only have a relatively good leakage-proof effect, but can help the user perform inhaling easily.

In an embodiment, as shown in FIG. 3, the vaporizer 100 further includes a gulp valve 160. The gulp valve 160 is disposed in the housing 110, an air outlet portion of the gulp valve 160 is located outside the liquid storage tank 130, and an air inlet portion of the gulp valve 160 is in communication with the external air. In a normal use situation, the air pressure in the liquid storage tank 130 is greater than or equal to the air pressure of the external air, so that the gulp valve 160 may keep closed under an action of the pressure difference or the elasticity of the gulp valve, to prevent the fluid in the liquid storage tank 130 from being leaked through the gulp valve 160. After the fluid in the liquid storage tank 130 is continuously consumed through vaporization of the vaporization component 140, the air pressure in the liquid storage tank 130 is decreased, and the gulp valve 160 is opened when the pressure on the air inlet portion side of the gulp valve 160 is greater than the pressure in the liquid storage tank 130 by at least 100 pa. The external air enters the liquid storage tank 130 to supplement the air pressure in the liquid storage tank 130, to avoid a situation that the fluid cannot be seeped into the vaporization component 140 for vaporization due to the excessively low air pressure in the liquid storage tank 130, thereby improving the smoothness of the liquid for vaporization. It should be noted that, the pressure difference between two sides and required for opening the gulp valve 160 may be 200 pa, 500 pa, 1000 pa, 1500 pa, 2000 pa, or higher, and the pressure difference required for opening the gulp valve 160 depends on a structure and a material of the gulp valve 160. When the air pressure of the air inlet portion of the gulp valve 160 required for opening the gulp valve 160 is greater than the pressure in the liquid storage tank 130 on the air outlet portion side by 100 pa to 2000 pa, the gulp valve 160 can supplement the air pressure in the liquid storage tank 130 in time, to maintain the smoothness of the flowing of liquid from the liquid storage tank 130 for vaporization.

In an embodiment, as shown in FIG. 3, there are three gulp valves 160, where one gulp valve 160 is located on the first end provided with the air outlet 112 of the housing 110; one gulp valve 160 is located on the second end provided with the air inlet 111 of the housing 110; and one gulp valve 160 is located on the side wall between the first end and the second end of the housing 110. In another embodiment, there may be only one gulp valve 160, and the gulp valve may be located at any position of the foregoing three positions. Alternatively, in another embodiment, there may be alternatively two, four, or more gulp valves 160, which is not limited herein.

Further, as shown in FIG. 3, the vaporizer 100 further includes a suction nozzle valve 170. The suction nozzle valve 170 is disposed in the airflow channel 120 and located between the air outlet 112 and the vaporization component 140, an air outlet portion of the suction nozzle valve 170 faces the air outlet 112, and an air inlet 111 of the suction nozzle valve 170 faces the vaporization component 140. In an inhale process of the user, the suction nozzle valve 170 is opened, and the vapor after vaporization may flow out from the air outlet 112 through the suction nozzle valve 170. After the inhalation is completed, the suction nozzle valve 170 is closed under an action of the elasticity of the suction nozzle valve, to further prevent leaked liquid from flowing out from the air outlet 112. The suction nozzle valve 170 is opened when pressure of the air inlet portion side of the suction nozzle valve 170 is greater than pressure outside the air outlet portion side of the suction nozzle valve 170 by at least 100 pa. It should be noted that, the pressure difference between two sides and required for opening the suction nozzle valve 170 may be 200 pa, 500 pa, 1000 pa, 1500 pa, 2000 pa, or higher, and the pressure difference required for opening the suction nozzle valve 170 depends on a structure and a material of the suction nozzle valve 170. When the pressure of the air inlet portion of the suction nozzle valve 170 required for opening the suction nozzle valve 170 is greater than the pressure outside the air outlet portion side by 100 pa to 2000 pa, the suction nozzle valve 170 can not only have a relatively good leakage-proof effect, but can help the user perform inhaling easily.

In an embodiment, as shown in FIG. 3 and FIG. 4, the air inlet valve 150, the gulp valve 160, and the suction nozzle valve 170 are all one-way valves 180, and the one-way valve 180 includes a base 181 and a deformable wall 182. The base 181 is provided with a through opening, the deformable wall 182 is disposed on the through opening, the deformable wall 182 is provided with a notch 1851, one side of the deformable wall 182 connected to the through opening forms an air inlet portion 183, and an air outlet portion 184 is formed at the notch 1851. In a normal case, the notch 1851 is closed. When the pressure of the air inlet portion 183 of the deformable wall 182 is greater than the pressure of the air outlet portion 184 to cause the deformable wall 182 to deform, the notch 1851 is opened, and the one-way valve 180 performs ventilation.

Specifically, as shown in FIG. 4, the deformable wall 182 of the one-way valve 180 includes two first deformable walls, and the two first deformable walls gradually draw close outward through the through opening to form a strip-shaped end 185 and form the elongated notch 1851 at the strip-shaped end 185.

In another embodiment, referring to FIG. 5 to FIG. 9, the one-way valve 180 may have a plurality of structures, and details are described below.

Figure 5:
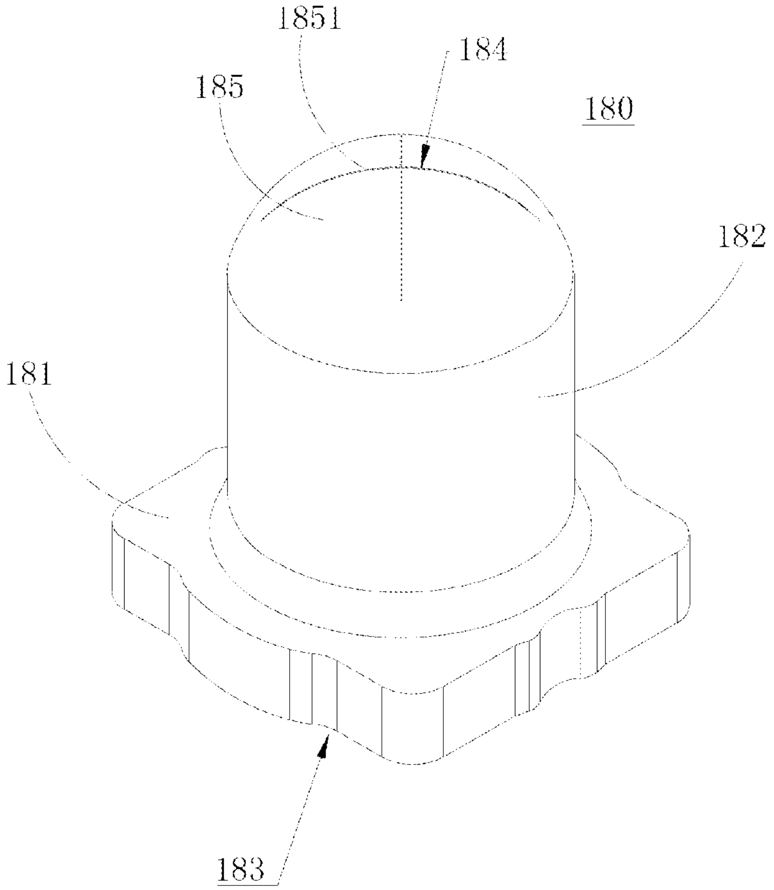
FIG. 5 is a three-dimensional schematic structural diagram of a one-way valve of a vaporizer according to another embodiment of this application.

As shown in FIG. 5, the deformable wall 182 of the one-way valve 180 may be in a shape of a cylinder, and the deformable wall 182 is closed to form a hemispherical end 185 after extending outward through the through opening, and forms the cross-shaped notch 1851 at the hemispherical end 185, where the cylinder-shaped deformable wall 182 is a deformable or a non-deformable material, and the hemispherical end 185 is a deformable material.

Figure 6:
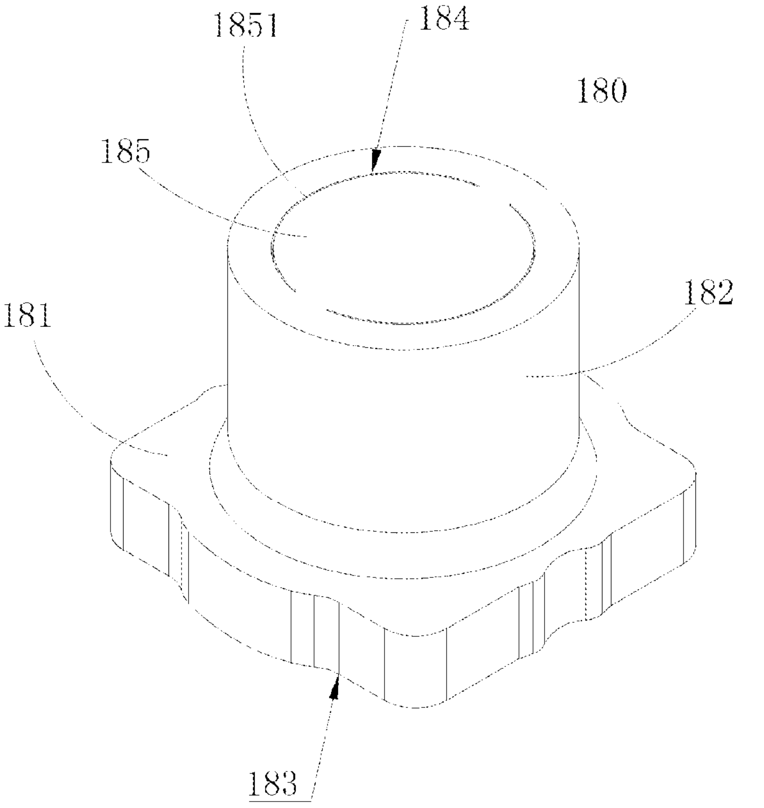
FIG. 6 is a three-dimensional schematic structural diagram of a one-way valve of a vaporizer according to still another embodiment of this application.

As shown in FIG. 6, the deformable wall 182 of the one-way valve 180 is in a shape of a cylinder, and the deformable wall 182 is closed to form a planar end 185 after extending outward through the through opening, and forms two arc-shaped notches 1851 at the planar end 185, where the notch 1851 is in a shape of a minor arc, the cylinder-shaped deformable wall 182 is a deformable or a non-deformable material, and the planar end 185 is a deformable material.

Figure 7:
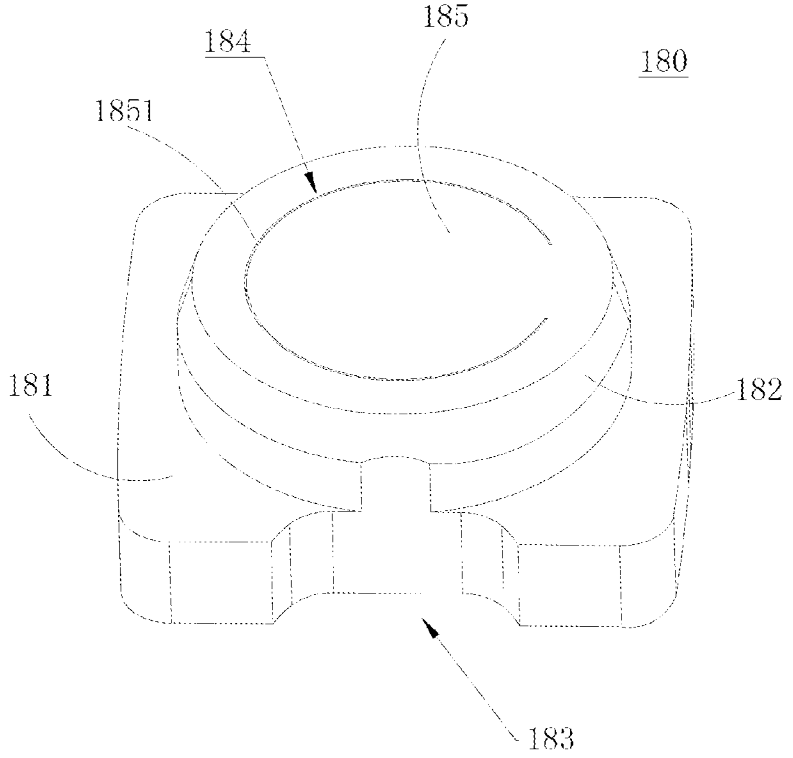
FIG. 7 is a three-dimensional schematic structural diagram of a one-way valve of a vaporizer according to still another embodiment of this application.
Figure 8:
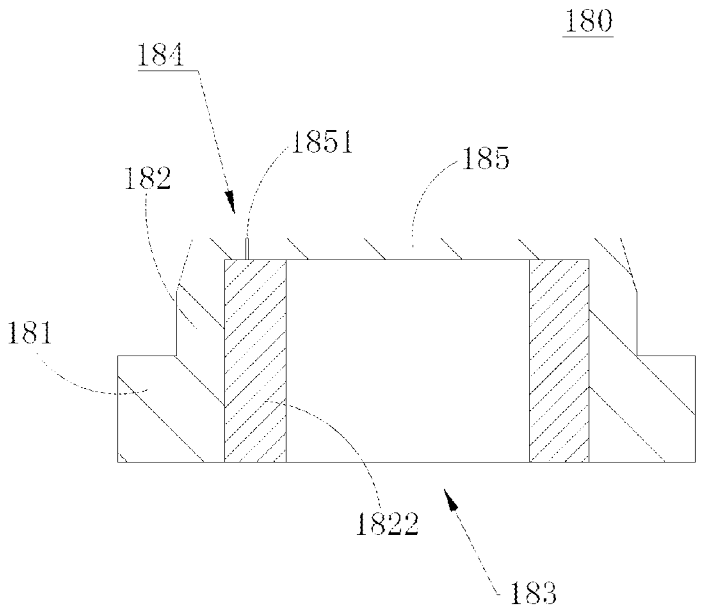
FIG. 8 is a schematic structural cross-sectional view of the one-way valve shown in FIG. 7.

As shown in FIG. 7 and FIG. 8, the deformable wall 182 of the one-way valve 180 is in a shape of a cylinder, and the deformable wall 182 is closed to form a planar end 185 after extending outward through the through opening, and forms an arc-shaped notch 1851 at the planar end 185, where the notch 1851 is in a shape of a major arc, and a support member 1822 for supporting the planar end 185 is disposed in the deformable wall 182 to prevent the notch from being opened to the side of the air inlet portion 183. The cylinder-shaped deformable wall 182 is a deformable or non-deformable material, and the planar end 185 is a deformable material.

Figure 9:
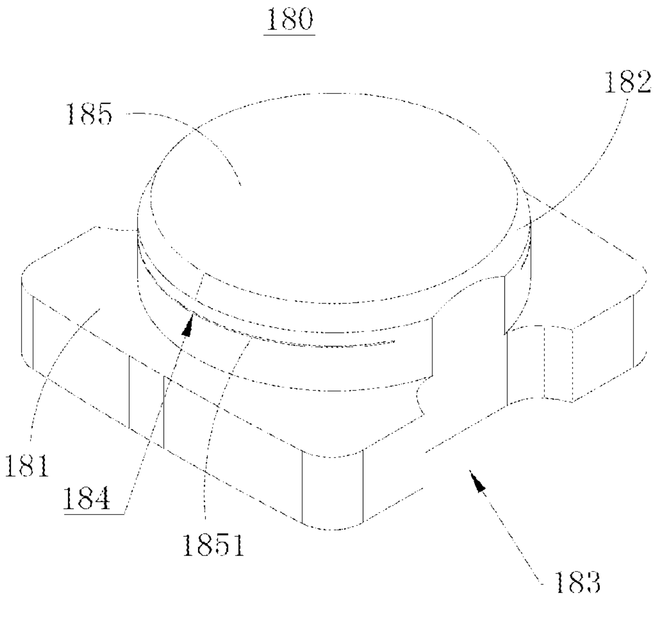
FIG. 9 is a three-dimensional schematic structural diagram of a one-way valve of a vaporizer according to still another embodiment of this application.

As shown in FIG. 9, the deformable wall 182 of the one-way valve 180 is in a shape of a cylinder, and the deformable wall 182 is closed to form a planar end 185 after extending outward through the through opening, and forms an arc-shaped notch 1851 at the side wall.

The foregoing one-way valve 180 of different structures may be selected according to an actual requirement or use condition.

Figure 10:
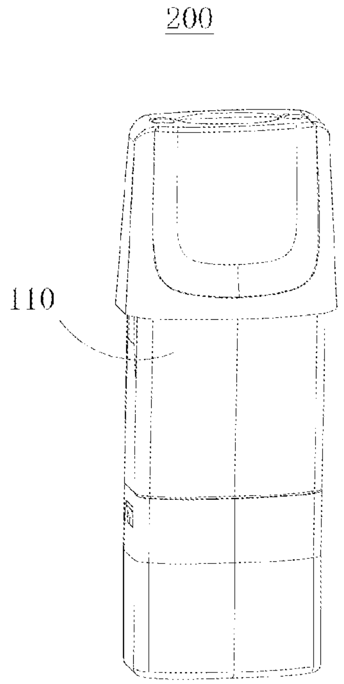
FIG. 10 is a three-dimensional schematic structural diagram of an electronic vaporization device according to an embodiment of this application.

Referring to FIG. 10, FIG. 10 is a three-dimensional schematic structural diagram of an electronic vaporization device according to an embodiment of this application. Another embodiment of this application provides an electronic vaporization device 200, including the vaporizer 100 in any one of the foregoing embodiments. The electronic vaporization device 200 further includes a power supply component, and the power supply component is configured to supply power to the vaporizer 100, so that the vaporizer 100 can vaporize a vapor-forming substrate into vapor.

Based on the above, in the vaporizer 100 of this application, the air inlet valve 150 is disposed in the airflow channel 120 between the air inlet 111 and the vaporization component 140, and the leaked liquid storage region 151 for storing leaked liquid is formed between the air inlet valve 150 and the vaporization component 140. Therefore, even if fluid in the liquid storage tank 130 leaks through the vaporization component 140, the liquid will accumulate in the leaked liquid storage region 151 rather than being leaked through the air inlet valve 150, thereby preventing the leaked liquid from polluting and damaging other elements after leaked from the air inlet 111. After inhalation is completed, the air inlet valve 150 can prevent occurrence of vapor reflux. In the vaporizer 100 of this application, the gulp valve 160 is further disposed in the housing 110. In a normal use situation, the air pressure in the liquid storage tank 130 is greater than or equal to the air pressure of the external air, so that the gulp valve 160 may keep closed under an action of the pressure difference or the elasticity of the gulp valve, to prevent the fluid in the liquid storage tank 130 from being leaked through the gulp valve 160. When the air pressure in the liquid storage tank 130 is insufficient, the gulp valve 160 can supplement the air pressure in the liquid storage tank 130 in time, to maintain the smoothness of the flowing of liquid from the liquid storage tank 130 for vaporization.

The foregoing descriptions are merely embodiments of this application, and the patent scope of this application is not limited thereto. All equivalent structure or process changes made according to the content of this specification and accompanying drawings in this application or by directly or indirectly applying this application in other related technical fields shall fall within the protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vaporizer, comprising:

a housing comprising an air inlet and an air outlet;

an airflow channel formed in the housing and running through the air inlet and the air outlet;

a liquid storage tank disposed in the housing;

a vaporization component disposed in the airflow channel and in fluid communication with the liquid storage tank;

an air inlet valve disposed in the airflow channel between the air inlet and the vaporization component, an air outlet portion of the air inlet valve being disposed close to the vaporization component, an air inlet portion of the air inlet valve being disposed away from the vaporization component;

a leaked liquid storage region configured to store leaked liquid, the leaked liquid storage region being formed between the air inlet valve and the vaporization component;

at least one gulp valve disposed in the housing, an air outlet portion of the at least one gulp valve being located in the liquid storage tank, and an air inlet portion of the at least one gulp valve being in communication with external air; and a suction nozzle valve disposed in the airflow channel and located between the air outlet and the vaporization component, an air outlet portion of the suction nozzle valve facing the air outlet, and an air inlet of the suction nozzle valve facing the vaporization component.

2. The vaporizer of claim 1, wherein the air inlet valve is configured to open upon pressure of the air inlet portion side of the air inlet valve being greater than pressure in the airflow channel on the air outlet portion side of the air inlet valve by at least 100 pa.

3. The vaporizer of claim 1, wherein the at least one gulp valve is located on a first end provided with the air outlet of the housing, and/or wherein the at least one gulp valve is located on a second end provided with the air inlet of the housing, and/or wherein the at least one gulp valve is located on a side wall between the first end and the second end of the housing.

4. The vaporizer of claim 3, wherein the at least one gulp valve comprises three gulp valves, and wherein the three gulp valves are respectively located on the first end provided with the air outlet of the housing, the second end provided with the air inlet of the housing, and the side wall between the first end and the second end of the housing.

5. The vaporizer of claim 1, wherein the at least one gulp valve is configured to open upon pressure of the air inlet portion side of the at least one gulp valve being greater than pressure in liquid storage tank by at least 100 pa.

6. The vaporizer of claim 1, wherein the suction nozzle valve is configured to open upon pressure of the air inlet portion side of the suction nozzle valve being greater than pressure outside the air outlet portion side of the suction nozzle valve by at least 100 pa.

7. The vaporizer of claim 1, wherein the air inlet valve, the at least one gulp valve, and the suction nozzle valve all comprise one-way valves, and each one-way valve comprises:

a base provided with a through opening; and at least one deformable wall disposed on the through opening and having a notch, wherein one side of the at least one deformable wall connected to the through opening forms the air inlet portion, and the notch forms the air outlet portion.

8. The vaporizer of claim 7, wherein the at least one deformable wall comprises two first deformable walls, and wherein the two first deformable walls gradually draw close outwardly through the through opening to form a strip-shaped end and form an elongated notch at the strip-shaped end.

9. The vaporizer of claim 7, wherein the at least one deformable wall is in a shape of a cylinder and closed to form a hemispherical end after extending outward through the through opening, and forms a cross-shaped notch at the hemispherical end.

10. The vaporizer of claim 9, wherein the hemispherical end comprises a deformable material.

11. The vaporizer of claim 7, wherein the at least one deformable wall is in a shape of a cylinder and closed to form a planar end after extending outward through the through opening, and forms two arc-shaped notches at the planar end, and wherein the notch is in a shape of a minor arc.

12. The vaporizer of claim 11, wherein the planar end comprises a deformable material.

13. The vaporizer of claim 7, wherein the at least one deformable wall is in a shape of a cylinder and closed to form a planar end after extending outward through the through opening, and forms an arc-shaped notch at the planar end, wherein the notch is in a shape of a major arc, and wherein a support member supporting the planar end is disposed in the at least one deformable wall.

14. The vaporizer of claim 13, wherein the planar end comprises a deformable material.

15. The vaporizer of claim 7, wherein the at least one deformable wall is in a shape of a cylinder and closed to form a planar end after extending outward through the through opening, and forms an arc-shaped notch at the side wall.

16. The vaporizer of claim 15, wherein the planar end comprises a deformable material.

17. The vaporizer of claim 1, wherein the housing comprises a mounting base configured to support the vaporization component and define the air inlet.

18. The vaporizer of claim 17, wherein the vaporization component comprises a vaporization core supported by the mounting base and fixed in the housing, one part of the vaporization core is located in the airflow channel, and an other part of the vaporization core is located in the liquid storage tank.

19. An electronic vaporization device, comprising:

the vaporizer of claim 1.

20. The electronic vaporization device of claim 19, further comprising:

a power supply component configured to supply power to the vaporizer.

* * * * *